United States Patent
Elia et al.

(10) Patent No.: US 12,311,418 B2
(45) Date of Patent: May 27, 2025

(54) SYSTEM FOR THE CONTROLLED DISTRIBUTION OF AQUATIC CAPPING MATERIAL AND THE CAPTURE OF DUST AND PARTICULATES

(71) Applicant: Sevenson Environmental Services, Inc., Niagara Falls, NY (US)

(72) Inventors: Michael C. Elia, Burt, NY (US); Steven C. Shaw, Bel Air, MD (US); Wayne Arthur Kostuk, Niagara Falls, NY (US)

(73) Assignee: SEVENSON ENVIRONMENTAL SERVICES, INC., Niagara Falls, NY (US)

(*) Notice: Subject to any disclaimer, the term of this patent is extended or adjusted under 35 U.S.C. 154(b) by 170 days.

(21) Appl. No.: 18/229,953

(22) Filed: Aug. 3, 2023

(65) Prior Publication Data

US 2025/0041917 A1 Feb. 6, 2025

(51) Int. Cl.
*E02B 3/12* (2006.01)
*B04C 9/00* (2006.01)
*B09B 1/00* (2006.01)

(52) U.S. Cl.
CPC .............. *B09B 1/004* (2013.01); *B04C 9/00* (2013.01); *E02B 3/121* (2013.01); *B04C 2009/001* (2013.01); *B04C 2009/002* (2013.01)

(58) Field of Classification Search
CPC ......... E02B 3/121; E02D 15/10; B09B 1/004; B04C 9/00; B04V 2009/001; B04V 2009/002
See application file for complete search history.

(56) References Cited

U.S. PATENT DOCUMENTS

| | | |
|---|---|---|
| 4,138,657 A | 2/1979 | Shave |
| 4,352,590 A | 10/1982 | Parker et al. |
| 4,571,121 A * | 2/1986 | Albert ............... E02D 15/10 405/226 |
| 4,759,664 A | 7/1988 | Deal |
| 5,150,986 A | 9/1992 | Rohr |
| RE35,535 E | 6/1997 | Brumley et al. |
| 5,775,836 A | 7/1998 | Dean, Jr. |
| 6,343,559 B1 | 2/2002 | Thomas |
| 6,817,119 B2 | 11/2004 | Kerfoot |
| 7,695,215 B2 | 4/2010 | Buhr et al. |
| 7,751,977 B2 | 7/2010 | Winkler et al. |
| 9,162,263 B2 | 10/2015 | Elia et al. |
| 10,900,192 B2 * | 1/2021 | Sheedy ............... B65G 65/44 |
| 11,149,394 B2 * | 10/2021 | Hennis ............... C04B 14/104 |
| 12,071,735 B2 * | 8/2024 | Timmis ............... E02B 3/128 |
| 2009/0304447 A1 * | 12/2009 | Buhr ............... E02B 3/121 405/17 |

(Continued)

*Primary Examiner* — Benjamin F Fiorello
(74) *Attorney, Agent, or Firm* — Hoffmann & Baron, LLP

(57) ABSTRACT

A system for the controlled distribution of capping material and the capture of dust and particulates includes an enclosure having a top wall and a continuous perimetrical side wall with an open bottom end. A cyclone inside the enclosure separates the air, dust, and particulates from solid materials. The air, dust, and particulates are exhausted from the enclosure to a filtering system. The solid capping material passes from the cyclone to a hopper and then to a spreader for the controlled distribution of the capping material through the open bottom end of the enclosure.

20 Claims, 5 Drawing Sheets

(56) References Cited

U.S. PATENT DOCUMENTS

2014/0169884 A1* 6/2014 Minola ............... E02F 5/104
                                                405/163
2016/0017551 A1* 1/2016 Wendorff ............ E01C 19/203
                                                222/1

* cited by examiner

SYSTEM FOR THE CONTROLLED DISTRIBUTION OF AQUATIC CAPPING MATERIAL AND THE CAPTURE OF DUST AND PARTICULATES

FIELD OF THE INVENTION

The present invention is a system for the controlled distribution of aquatic capping material on the bottom of a body of water. In particular, the present invention relates to a system for uniformly spreading aquatic capping material on the bottom of a body of water and capturing dust and particulate materials so that they are not released into the atmosphere.

BACKGROUND OF INVENTION

The pollution of lakes, rivers and coastal waters by the unregulated discharge and dumping of industrial, agricultural and municipal wastes has severely damaged the environment. In some cases, the waters have been so seriously impacted that they can no longer support aquatic life or the fish and crustaceans that survive in the waters are no longer safe for human consumption.

The Clean Water Act of 1972 and other similar legislation have established goals for eliminating releases of high amounts of toxic substances into waters and ensuring that surface waters meet certain standards. In addition to limiting the current discharge of pollutants, an effort has been made to remediate lakes, rivers and other bodies of water that have been identified as particularly hazardous to the environment and the health of humans. The remediation can include some form of dredging to remove pollutants that have settled to the bottom of the bodies of water and mixed in with the natural mud and sediments. The amount of material that must be removed can vary from several inches to several feet at different sites. In most cases, the pollutants have migrated so deep into the mud and sediments that it is impractical to entirely remove them. Therefore, dredging is conducted until the pollutants in the dredged materials are determined to be present at a safe level. However, even at safe levels, it is desirable to prevent the pollutants from mixing with the water. Therefore, an aquatic cap material is spread over the bottom of the dredged body of water to act as a barrier between the pollutants in the sediments and the water. In some instances, capping is the only remediation that is required to isolate and trap the pollutants.

The aquatic capping systems that are currently being used do not adequately control the distribution of the aquatic capping materials so that it is necessary to deposit a thicker layer of cap material on the bottom of the body of water to ensure that the cap provides a sufficient barrier. In addition, the position of the barge or boat discharging the aquatic capping material and the aquatic cap material discharging apparatus presently being used do not spread a uniform layer of the aquatic capping material on the bottom. This also results in a thicker layer of aquatic capping material being placed on the bottom to ensure a minimum layer thickness. Moreover, the aquatic capping systems currently in use release dust and particulate materials (also referred to herein interchangeably as "particulates") to the surrounding atmosphere when dry, or substantially dry, capping material is discharged into the water. Accordingly, there is a need for an aquatic capping system that can provide a layer of aquatic capping material with a highly uniform thickness and control the dust and particulate materials released when the aquatic capping material is discharged into the body of water.

SUMMARY OF THE INVENTION

A system for controlled distribution of capping material and capture of dust and particulates comprises, consists of, or consists essentially of an enclosure and a spreader. The enclosure has an interior, an inlet formed by an aperture for receiving capping material, and an outlet formed by an opening for removing dust and particulates. The enclosure has a top wall with a perimetrical edge, a continuous side wall extending downwardly from the perimetrical edge to an open bottom end, and a rigid internal support structure. The spreader, preferably a rotating plate spreader, distributes the capping material through the open bottom end of the enclosure in an even and controlled manner.

The enclosure can further comprise, consists of, or consists essentially of a cyclone and a hopper. The cyclone is located between the inlet and the spreader and receives the capping material via the inlet. The cyclone separates gases (mostly air) and dust from solid materials and has an inlet port for receiving the capping material, a first outlet port for air, dust, and particulates, and a second outlet port for solid material. The hopper receives the capping material from the second outlet port of the cyclone and is located between the cyclone and the spreader. The hopper ensures that the capping material is fed into the spreader at a controlled rate.

The support structure provides support for the enclosure and spreader and optionally for the cyclone and the hopper as well, and includes attachment points for lifting the enclosure. The top wall and the continuous side wall of the enclosure are made of a substantially impermeable material, preferably a tightly woven fabric or plastic. The enclosure inlet and the enclosure outlet can be located in either the top wall or the continuous side wall. Preferably, the enclosure inlet is located in the continuous side wall and the enclosure outlet is located in the top wall. The enclosure outlet can be connected to one or more filters, an electrostatic precipitator, or a baghouse located remotely from the enclosure and connected by a hose.

BRIEF DESCRIPTION OF THE FIGURES

The preferred embodiments of the system for the controlled distribution of aquatic capping material and capture of dust and particulates of the present invention, as well as other objects, features and advantages of this invention, will be apparent from the accompanying drawings wherein.

DETAILED DESCRIPTION OF THE INVENTION

Figure 1:
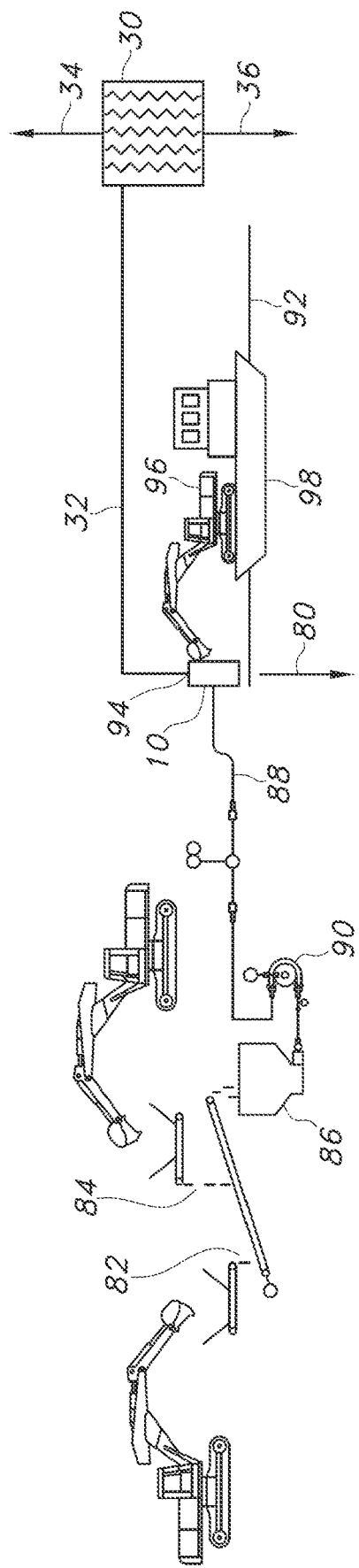
FIG. 1 is a schematic of the preparation and loading of aquatic capping material into a preferred embodiment of the distribution system and the remote capture of dust and particulates.

The present invention is a system for the controlled and even distribution of an aquatic capping without the introduction of water to the dry or substantially dry capping material prior to immersion in the body of water. The system also provides for the capture of dust and particulates generated by transfer of the dry capping material. The system can be sized up or down to adjust for capping material physical characteristics, capping layer thicknesses, and site requirements. Additionally, the capping system can be used for the placement of capping materials that are prone to premature deterioration when contacted by water. This ensures that any chemical or physical reactions between the capping materials and water are not completed until the materials settle to the bottom of the body of water.

As used herein, the term "cyclone" refers to a device used to remove dust or particulate materials from an air, gas or liquid stream, without the use of filters, through vortex separation.

As used herein, the term "hopper" refers to a large, inverted pyramidal or conical container used in industrial processes to receive at the top and hold particulate matter or flowable material of any sort (e.g. sand, gravel, soil, or clay) and dispense these materials from the bottom as needed.

As used herein, the term "pneumatic transportation system" refers to a system that uses air pressure produced for example by a blower, fan or compressor to convey solid materials through a pipe or conduit.

As used herein, the term "baghouse" refers to an air pollution control device and dust collector that treats the exhaust air emissions of commercial processes to remove particulates out of the air.

The controlled distribution system facilitates even spreading of capping materials, such as dry silts, sands, gravel, soil, different types of clay, granular or powdered activated carbon, other materials and/or mixtures thereof. The scope of the invention is not limited by the type of material that is spread by the system. The present invention contemplates spreading any type of materials that can be transported pneumatically through a hose, a conduit, or a pipe and that is capable of forming a cap over contaminated sediments on the bottom of a body of water.

The main components of the system are the capping material preparation system and the distribution system. The capping material preparation system can include one or more loading hoppers, one or more conveyor belts, a mixing system for combining sand, clay, carbon, and other materials, a pneumatic transport system, a conduit/pipeline that connects the preparation system to the distribution box, and an exhaust recovery system that collects the dust and particulate materials from the distribution box and conveys them to a filtering system prior to venting the filtered air to the atmosphere.

The distribution system can have several embodiments that are designed based on the capping material used. The composition of capping materials can vary based on the requirements for a specific project. Accordingly, the equipment inside the distribution box (also referred to herein interchangeably as an "enclosure") for distributing the capping material is also dependent on the composition of the capping material. Different types of capping material, such as sand, require a higher capacity for removing dust and particulate materials from the enclosure. Some capping materials generate less dust and particulates so that the dust removal capacity for the enclosure can be reduced and the selection of the equipment inside the enclosure can vary. For example, capping materials that generate minimal amounts of dust and particulate materials may only require a filter system on top of the enclosure. In contrast, dry capping materials that generate significant amounts of dust and particulate materials require more than a filter. In those cases, an exhaust vent at the top of the enclosure removes the dust and particulates through a conduit to a remote filtering facility, such as a baghouse, for filtering the exhaust before the filtered air is released to the atmosphere.

In a preferred embodiment, a feed hopper, pneumatic transportation unit, an excavator, and a control system are used to feed the capping material to the distribution system. The feed component includes the feed hopper and the pneumatic transportation unit, which can be positioned on land or on a marine vessel, such as a floating barge, depending upon the proximity of the aquatic capping location to the shoreline. A smooth walled hose or piping system connects the feed hopper via the pneumatic transportation unit to the distribution system. The distribution system is typically supported by an excavator, a crane or a similar device used for lifting heavy loads that is mounted on a marine vessel, such as a barge, pontoon, or a floating platform. The marine vessel can be equipped with a controller that uses speed tracking (feet per second) and positioning (x,y,z) to monitor the location of the distribution system in real-time, to evenly distribute the capping material and track and store data relating to the capping material placement.

In one embodiment, the pneumatic transportation unit transports the capping material from a hopper to the distribution system through a smooth walled hose using a blower and eductor connected to the bottom of the feed hopper. When connected by a hose to the blower, the eductor acts like a pump to transport the capping material. The blower and eductor create a venturi transport system, which controls the draw of dry capping material from the feed hopper to pneumatically transport capping materials to the distribution system.

In a particularly preferred embodiment, the distribution system includes an enclosure having a top wall with an opening, a perimetrical side wall extending downwardly from the top wall to an open bottom end, and an internal support structure. The enclosure can house a spreader, which directly receives the capping material, and optionally a cyclone and a hopper. When a cyclone and a hopper are used in addition to the spreader, the cyclone receives the forced air and capping materials through an aperture in the perimetrical side wall and separates gases from dust and particulate materials, i.e., the high flow conveyance air from the capping materials. After separation, the conveyance air is discharged via a first outlet port at the top of the cyclone to the opening in the top wall of the enclosure, while the capping materials are discharged through an outlet on the bottom of the cyclone to a hopper. The hopper collects and evenly feeds the capping material downwardly into the spreader, preferably a rotary disc spreader. The spreader evenly disperses the capping materials outwardly in a horizontal direction against the interior of the continuous side wall.

The enclosure limits the horizontal distribution of the capping material, contains the dust, and allows for more consistent tracking and placement of capping material on the water surface. The enclosure/distribution box has a rigid frame that supports the top wall and the continuous perimetrical side wall as well as the distribution equipment (i.e., the spreader and optionally the cyclone and the hopper) inside the enclosure. The top wall and perimetrical side wall are preferably made of a material that confines the capping material and dust inside the enclosure/distribution box, such as plastic or a tightly woven fabric, and is substantially impermeable to dust particles.

Distribution Unit Speed Meter

A swing speed meter allows the operator to control the advance of the distribution system in feet per minute of the distribution component of the pneumatic capping unit. This allows the operator to place consistent layers of material by maintaining a constant speed that is calibrated to the feed rate of the capping material. When mounted on an excavator, the swing speed meter includes a rotational encoder mounted on the excavator platform, two angle sensors on the boom and stick of the machine, a Programmable Logic Controller (PLC), and display. The angle sensors allow for real-time calculation of the distance between the center of the machine and the drop point of the capping material using the distance the machine is reaching out and the rotational speed at the cab platform, the rotational speed at the drop point is calculated and displayed.

The controller preferably includes a computer or processor with sufficient software and memory to store programs and data, perform the functions detailed herein and facilitate Internet connectivity. The controller interface device can include a display, monitor (preferably a touch screen monitor), keyboard and mouse for use by an operator on the barge. The controller can also be accessed remotely by a wireless connection using radio, cell phone or satellite technology.

Distribution Unit Positioning

A Global Positioning System (GPS) is used to track the distribution system as it moves in a grid pattern defining the area for deposition of the capping material. The system utilizes two Global Satellite Navigation System (GNSS) receivers mounted on the marine vessel, which are capable of tracking GPS, Global Navigation Satellite System (GLONASS), and Galileo satellites. These antennas receive real-time position and heading from these satellites. The position of the base station location is fixed by the project surveyor and used to correct the position determined by the antennas to ensure the equipment's accuracy. This achieves Real-time kinematic positioning (RTK) accuracy, i.e., the use of surveying to correct for common errors in current satellite navigation (GNSS) systems.

When the excavator or crane on the marine vessel is used to move the distribution system, in addition to the GPS receivers, solid state angle sensors are mounted to the boom, stick, bucket, and body of the machine. The sensor on the body of the machine measures the pitch and roll of the cab, while the other sensors measure the angle of the component they are attached to. Once all these sensors are mounted, the machine is calibrated to ensure that measurements are as precise as possible. These measurements and the GPS position and heading are inputted into the positioning system, which outputs the real-time position and orientation of the distribution unit.

The controlled distribution system for pneumatic spreading of capping material and capture of dust and particulates is now described as shown in the accompanying figures. In the embodiment shown in FIG. 1, two excavators are loading a combination of materials 82, 84 in a hopper 86 to form the capping material 80. The materials 82, 84 used can be selected from clay, sand, granular activated carbon ("GAC"), gravel, and silt and are combined to form the capping material 80. The type and amount of each constituent material 82, 84 is determined by the specific requirements of a project. The capping material 80 is transferred from the hopper 86 to the distribution system 10 through a hose, pipe or conduit 88 using a pneumatic transportation system 90. The distribution system 10 deposits the solid capping material 80 onto the surface of a body of water 92 and separates the air and dust 94, which is transferred to a filtering system 30.

Figure 2:
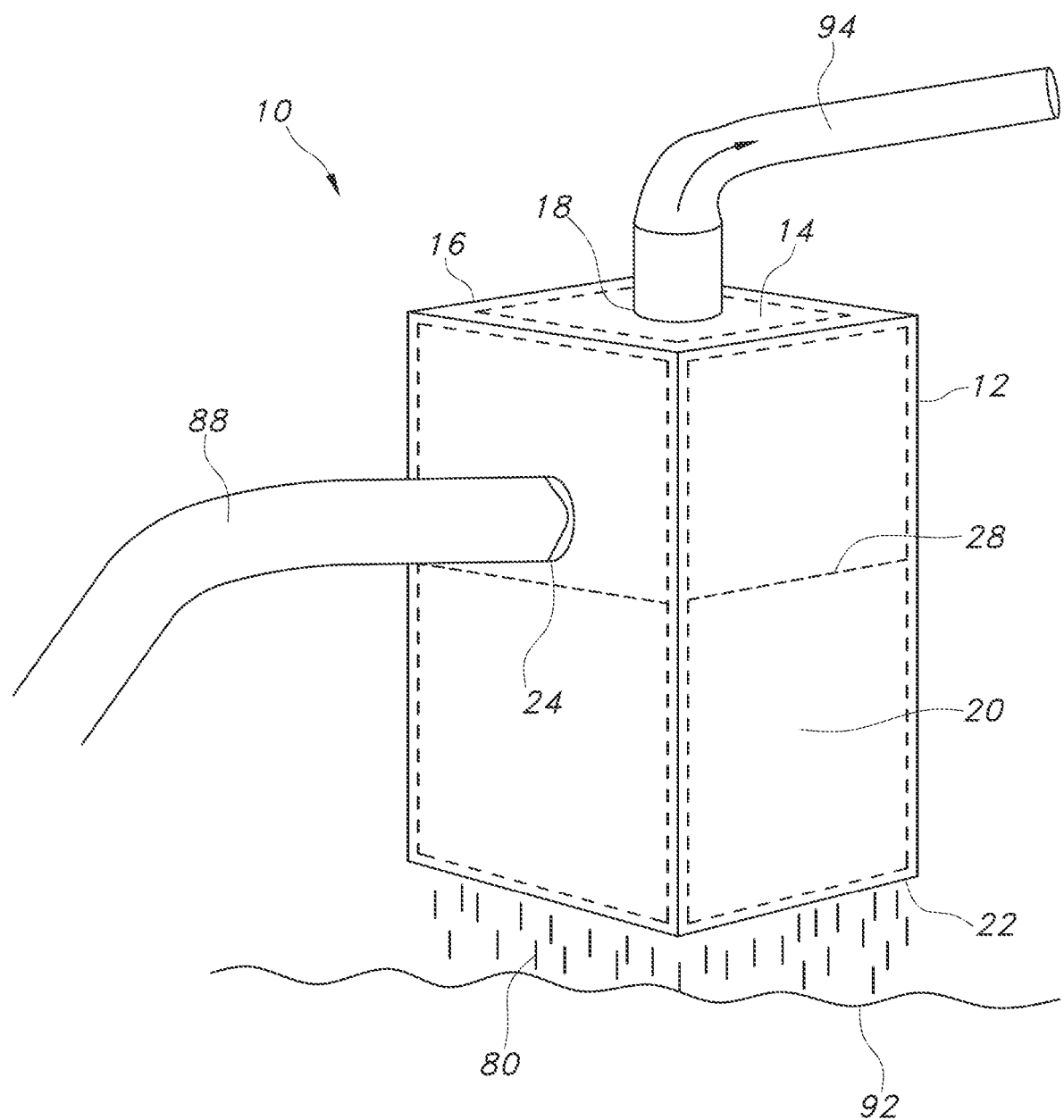
FIG. 2 is a peripheral exterior side view of an embodiment of the enclosure.

FIG. 2 shows an exterior view of a preferred embodiment of the enclosure 12 for the distribution system 10. The enclosure 12 has a top wall 14 with a perimetrical edge 16 and an opening 18 for exhausting air entrained with dust and particulates 94. A continuous side wall 20 extends downwardly from the perimetrical edge 16 to an open bottom end 22. Capping material 80 passes into the enclosure 12 through an aperture 24 in the continuous side wall 20. A rigid internal frame 28 supports the enclosure 14 and any equipment inside the enclosure 14.

Figure 3:
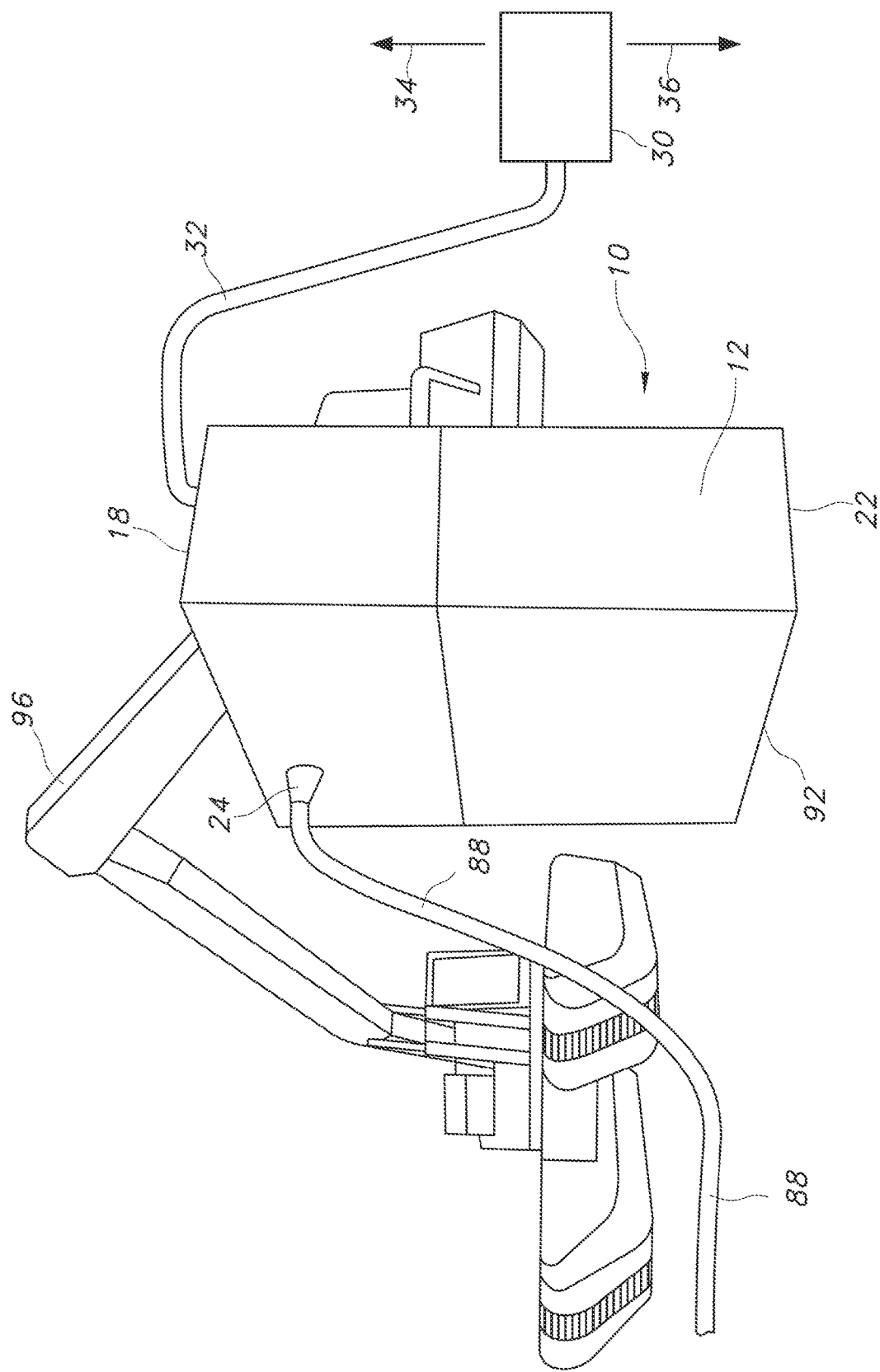
FIG. 3 is a peripheral side view of the enclosure attached to the side of an excavator bucket.
Figure 4:
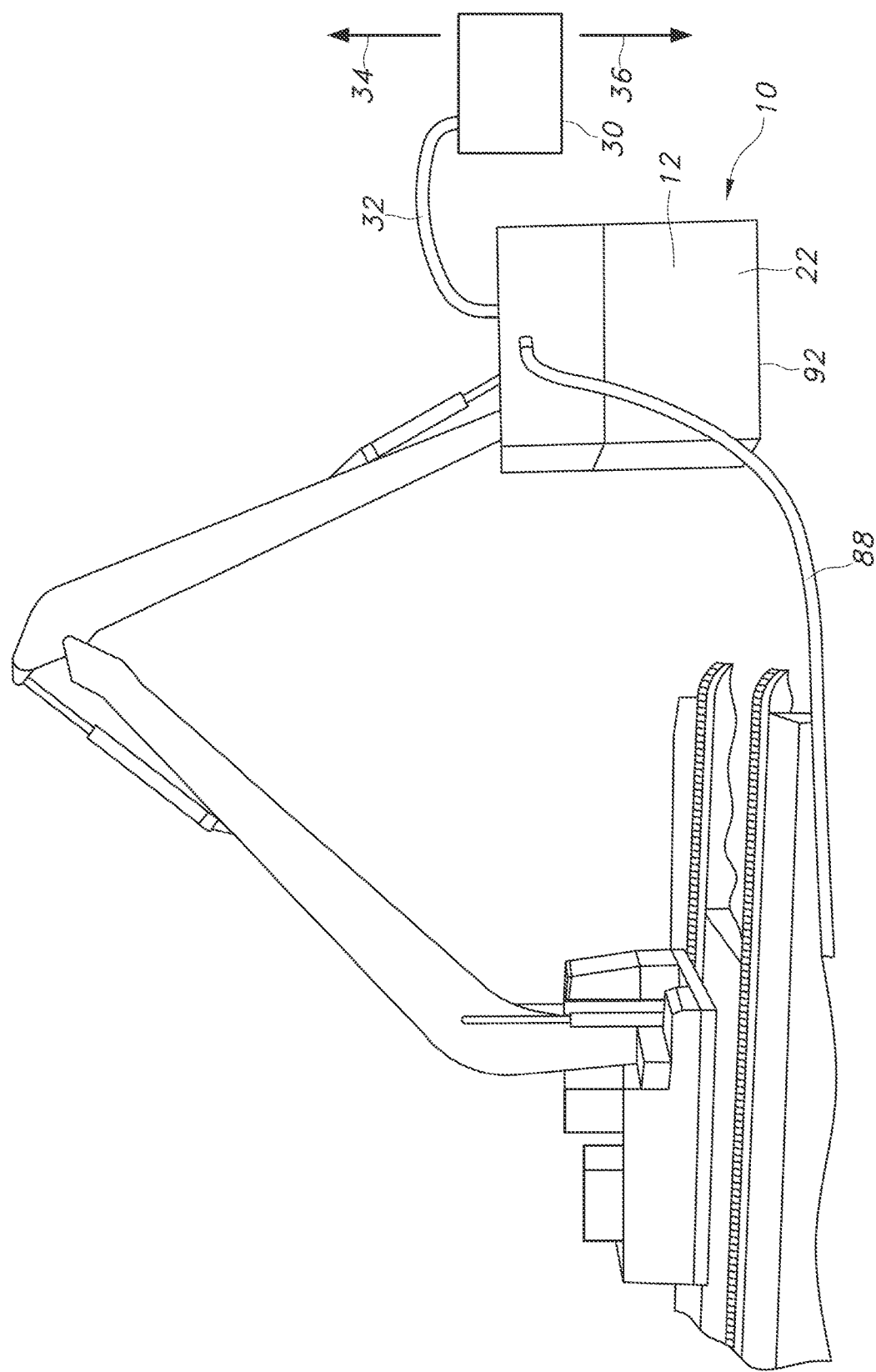
FIG. 4 is a side view of the enclosure attached to the side of an excavator bucket and suspended over a pond.

FIG. 3 and FIG. 4 show the enclosure 12 attached to an excavator 96 transported by a barge 98 and suspended over a body of water 92. The operators maneuver the excavator 96 and the barge 98 to reposition the enclosure 12 over different parts of the area that are selected for depositing the capping material 80. Typically, the area is divided into grid sections with each grid slightly smaller than the dimensions of the bottom end 22 of the enclosure 12 to ensure an overlap. After the prescribed amount of capping material 80 is deposited in a grid section, the enclosure is moved to an adjacent grid section. Using the flow rate of the capping material 80 through the transport system 90, the required layer thickness for the deposited capping material 80 and the characteristics of the body of water (i.e., the depth and current) the operators can determine the length of time the capping material is deposited in a grid section in order to achieve the desired thickness of the capping material layer.

Figure 5:
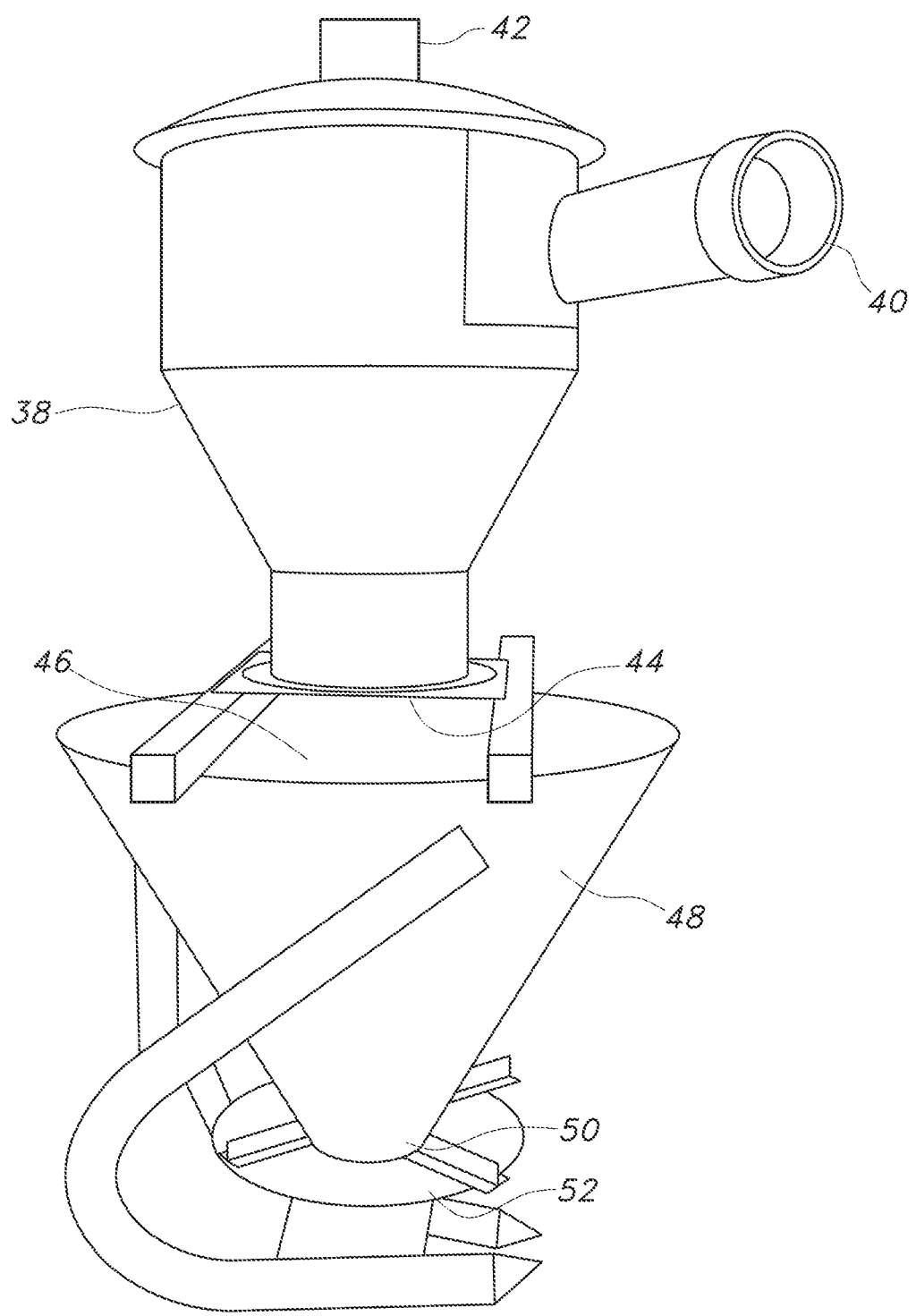
FIG. 5 is a side view of the cyclone, hopper, and spreader before they are mounted on the support structure and installed in the enclosure.

FIG. 5 shows a preferred embodiment of the equipment that can be housed in the enclosure 12 to distribute the capping material 80. The capping material 80 sent to the enclosure 12 is received by a cyclone 38 through an inlet port 40. The cyclone 38 separates and exhausts the air used in the pneumatic transportation system 90 along with dust and particulates 94, through a first outlet port 42 in the top, from the solid capping material 80, which is discharged through the second outlet port 44 located at the bottom of the cyclone 38. The air, dust, and particulates 94 are exhausted through the opening in the top 18 of the enclosure 12 and transported through a hose 32 to a filtering system 30, preferably one or more filters, an electrostatic precipitator, or a baghouse. The filtering system 30 separates the filtered air 34 from the solid materials 36.

The solid capping material 80 is discharged from the cyclone 38 into the top 46 of a hopper 48 that collects the capping material 80 and discharges it as needed through the bottom end 50 to a spreader 52. The spreader 52 evenly distributes the capping material 80 on a horizontal plane against the continuous side wall 20 of the enclosure 12. This provides an equal amount of capping material 80 distributed within the cross-sectional area of the bottom end 22 of the enclosure 12. For some projects, a cyclone 38 is not required because the capping material 80 releases a minimum amount of dust and particulates 94 and the capping material 80 is fed directly into the hopper 48. The cyclone 38, the hopper 48, and the spreader 52 are mounted on the internal support structure 28.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A system for controlled distribution of capping material and capture of dust and particulates, the system comprising:
   an enclosure having an interior, an inlet formed by an aperture for receiving capping material, and an outlet formed by an opening for removing dust and particulates, the enclosure comprising:
      a top wall having a perimetrical edge;
      a continuous side wall extending downwardly from the perimetrical edge of the top wall to an open bottom end of the enclosure; and
      a rigid internal support structure; and
   a spreader for the controlled distribution of the capping material through the open bottom end of the enclosure.

2. The system according to claim 1 further comprising a cyclone for receiving the capping material via the inlet, wherein the cyclone is located between the inlet and the spreader.

3. The system according to claim 2, wherein the cyclone has an inlet port for receiving the capping material, a first outlet port for air, dust, and particulates, and a second outlet port for solid material.

4. The system according to claim 2 further comprising a hopper for receiving the capping material from the second outlet port of the cyclone, wherein the hopper is located between the cyclone and the spreader.

5. The system according to claim 4, wherein the support structure provides support for the enclosure, the cyclone, the hopper, and the spreader.

6. The system according to claim 1, wherein the spreader is a rotating plate spreader.

7. The system according to claim 1, wherein the support structure comprises attachment points for lifting the enclosure.

8. The system according to claim 1, wherein the top wall and perimetrical side wall of the enclosure are made of a substantially impermeable material.

9. The system according to claim 1, wherein the top wall and perimetrical side wall of the enclosure are made of a tightly woven fabric or plastic.

10. The system according to claim 1, wherein the enclosure inlet is located in the continuous side wall.

11. The system according to claim 1, wherein the enclosure outlet is located in the top wall or the continuous side wall.

12. The system according to claim 1, wherein the enclosure outlet is connected to one or more filters, an electrostatic precipitator, or a baghouse.

13. A system for controlled distribution of capping material and capture of dust and particulates, the system comprising:
   an enclosure having an interior, an inlet formed by an aperture for receiving capping material, and an outlet formed by an opening for removing dust and particulates, the enclosure comprising:
      a top wall having a perimetrical edge;
      a continuous side wall extending downwardly from the perimetrical edge of the top wall to an open bottom end of the enclosure; and
      a rigid internal support structure; and
   a cyclone for receiving the capping material via the inlet;
   a hopper for receiving the capping material from the cyclone;
   a spreader for receiving the capping material from the hopper and for the controlled distribution of the capping material through the open bottom end of the enclosure.

14. The system according to claim 13, wherein the cyclone has an inlet port for receiving the capping material, a first outlet port for air, dust, and particulates, and a second outlet port for solid material.

15. The system according to claim 13, wherein the support structure provides support for the enclosure, the cyclone, the hopper, and the spreader.

16. The system according to claim 13, wherein the top wall and continuous side wall of the enclosure are made of a substantially impermeable material.

17. The system according to claim 13, wherein the enclosure inlet and the enclosure outlet are located in the top wall or the continuous side wall.

18. The system according to claim 13, wherein the spreader is a rotating plate spreader.

19. The system according to claim 13, wherein the support structure comprises attachment points for lifting the enclosure.

20. The system according to claim 13, wherein the enclosure outlet is connected to one or more filters, an electrostatic precipitator, or a baghouse.

* * * * *